3,284,515
TRIBROMOPROPENOL

Richard T. Dickerson, Midland, Mich., and William F. Tousignant, Wauwatosa, Wis., assignors to The Dow Chemical Company, Midland, Mich., a corporation of Delaware
No Drawing. Filed June 14, 1963, Ser. No. 287,802
1 Claim. (Cl. 260—633)

The present invention is concerned with organic chemistry and is particularly directed to 2,3,3-tribromo-2-propen-1-ol. The present compound, which is of the formula

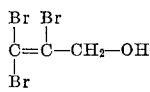

is a white crystalline material melting at 69–70° C. It is of very low solubility in water but readily soluble in acetone and benzene. The compound is useful as an anthelmintic for the control of numerous helminth organisms, as an insecticide, and as a herbicide. Also the compound can be employed as an additive in polymeric compositions to render such compositions self-extinguishing when ignited.

The present compound is readily prepared by reacting 3-bromo-2-propyn-1-ol and bromine. The reacting is caused by contacting the reactants together. The reaction is exothermic and proceeds conveniently at temperatures of from 0 to 20° C.

The amounts of the reactants to be employed are not critical, some of the desired product compound being obtained when employing the reactants in any amounts. However, the reaction consumes the reactants in equimolecular proportions and the use of amounts which represent such proportions, or of an excess of the bromine reactant, is preferred.

Advantageously, the reaction is carried out in an inert liquid reaction medium, such as a mixture of hydrocarbons, chlorinated hydrocarbons, water, saturated alkyl ethers, and other solvents commonly used for bromination reactions. The desired product compound is insoluble in some substances which are solvents for all starting materials; progress of the reaction in such solvent can be observed as progress in the formation of a granular deposit from solution. Progress of the reaction is also indicated by decolorization of free bromine.

Granular product deposited from solution can readily be separated by filtration and air dried. Alternatively, solvent and unreacted excess bromine can be separated from the product by evaporation under atmospheric or subatmospheric pressure. If desired, the granular product can be washed with portions of liquid which may be reaction solvent or the like, and which will serve as wash solvent for impurities but leave the desired product essentially unaffected.

The product can be employed without separation from the reaction mixture or can be simply separated and manifests the useful properties of the present invention; when it is desired that the product be obtained in purer form, purification can readily be carried out by recrystallization from solvent, such as carbon tetrachloride, tetrachloroethylene, methyl chloroform, and the like, or a mixture of a lower alcohol and water. Purification can also be accomplished by distillation under subatmospheric pressure, such as, for example, about 200 millimeters or less, or preferably, about 50 millimeters or less.

In the best method known, the 3-bromo-2-propyn-1-ol to be employed as reactant in the preparation of the present product compound is conveniently prepared by known methods in situ. In such operation, for example, 2-propyn-1-ol is reacted conveniently at temperatures of about 0° C., with an aqueous solution of sodium hypobromite which contains sufficient sodium hydroxide to suppress hydrolysis of the sodium hypobromite. Such reaction prepared in solution the 3-bromo-2-propyn-1-ol compound and further sodium hydroxide by-product. The sodium hydroxide is neutralized by the addition to the solution of a strong acid, such as sulfuric acid, before the 3-bromo-2-propyn-1-ol is employed to prepare the present product compound.

In an alternative method of synthesis, the 2,3,3-tribromo-2-propen-1-ol is prepared by the dehydrohalogenation, in known procedures of 2,2,3,3-tetrabromo-1-propanol. Conveniently, the dehydrohalogenation is effected by reacting an aqueous solution of sodium hydroxide with 2,2,3,3-tetrabromo-1-propanol at room temperature and with stirring, to obtain the 2,3,3-tribromo-2-propen-1-ol product as a precipitate in the aqueous solution. The product can then be separated and purified in manners well known to those skilled in the art.

In a specific embodiment of the best mode of carrying out the present invention, 400.0 grams of sodium hydroxide (10.0 moles) were dispersed in 1300 milliliters of water. To the resulting dispersion was first added 160.0 grams of bromine (2.2 moles) and later added a solution of 56.0 grams of 2-propyn-1-ol (1.0 mole) in 150 milliliters of water to prepare the 3-bromo-2-propyn-1-ol intermediate in the reaction mixture. During the additions, the reaction mixture was maintained at a temperature of about 0° C., with continuous stirring.

The reaction mixture was thereafter neutralized by the addition thereto of 25 percent aqueous sulfuric acid, the temperature of the reaction mixture being maintained at about 10–20° C. during the addition. Bromine (160.0 grams; 2.2 moles) was added to the neutralized reaction mixture, at a temperature of 10–20° C., resulting in the precipitation of the 2,3,3-tribromo-2-propen-1-ol product as a white crystalline material.

The product was separated from the reaction mixture by filtration and the separated product washed with small quantities of water to remove impurities. The washed product, after several recrystallizations from tetrachloroethylene, was found to melt at 69–70° C. The product distills at 120° C. under a pressure of 8 millimeters of mercury.

The present compound was found to be effective as an anthelmintic when employed in known techniques for the control of helminth species of a wide variety. For example, the 2,3,3-tribromo-2-propen-1-ol, when mixed as sole active toxicant with fresh calf feces infested with larvae of Cooperia sp., Trichostrongylus sp., *Haemonchus contortus*, *Ostertagia ostertagi*, Esophogostomum sp., and Bunostomum sp., and the resulting mixture held for a period of about five days, was found to give one hundred percent kill and control of the larvae of all of the named helminth species. The present compound is also of relatively low acute oral mammalian toxicity; for example, administration to each individual of a representative population of laboratory mice of 100 milligrams, of 2,3,3-tribromo-2-propen-1-ol per kilogram of body weight of the individual occasioned no adverse effect upon the mice, which appeared to be in good health following the administration.

We claim:
2,3,3-tribromo-2-propen-1-ol.

References Cited by the Examiner

Roedig et al.: Chemische Berichte, vol. 86 (1953), page 1472.

LEON ZITVER, *Primary Examiner.*

M. B. ROBERTO, J. E. EVANS, *Assistant Examiners.*